(12) United States Patent
Patrick (10) Patent No.: US 9,477,647 B2
(45) Date of Patent: *Oct. 25, 2016

(54) VERIFYING CONTENT OF RESOURCES IN MARKUP LANGUAGE DOCUMENTS BY INCLUSION OF A HASH ATTRIBUTE-VALUE PAIR IN REFERENCES TO THE CONTENT

(71) Applicant: International Business Machines Corporation, Armonk, NY (US)

(72) Inventor: Kyle N. Patrick, British Columbia (CA)

(73) Assignee: International Business Machines Corporation, Armonk, NY (US)

( * ) Notice: Subject to any disclaimer, the term of this patent is extended or adjusted under 35 U.S.C. 154(b) by 494 days.

This patent is subject to a terminal disclaimer.

(21) Appl. No.: 14/020,946

(22) Filed: Sep. 9, 2013

(65) Prior Publication Data

US 2014/0006933 A1 Jan. 2, 2014

Related U.S. Application Data

(63) Continuation of application No. 11/586,883, filed on Oct. 26, 2006, now Pat. No. 8,549,390.

(51) Int. Cl.
*G06F 17/00* (2006.01)
*G06F 17/22* (2006.01)
*G06F 17/27* (2006.01)

(52) U.S. Cl.
CPC ....... *G06F 17/2247* (2013.01); *G06F 17/2229* (2013.01); *G06F 17/2725* (2013.01)

(58) Field of Classification Search
CPC ........... G06F 17/2229; G06F 17/2247; G06F 17/2725; G06F 21/64; H04L 63/12
See application file for complete search history.

(56) References Cited

U.S. PATENT DOCUMENTS 6,108,703 A 8/2000 Leighton et al.
6,941,477 B2 9/2005 O'Keefe
(Continued)

OTHER PUBLICATIONS

Mozdev.org, "MDHashTool Version 0.4", released Aug. 29, 2005, series of 26 screenshots from website, <"http://mdhashtool.mozdev.org/"> describing MDHashTool plugin for Firefox 1.0 and Firefox 1.5 Beta 1 and illustrating features including introduction of support for "Link Fingerprints", 26 pages.
(Continued)

*Primary Examiner* — Cesar Paula
*Assistant Examiner* — James H Blackwell
(74) *Attorney, Agent, or Firm* — Schmeiser, Olsen & Watts, LLP; John Pivnichny (57) ABSTRACT

A method and system for verifying resource content. A first characteristic of the content of a resource stored at a second computer is computed. The second computer is coupled to the first computer via a communication infrastructure. A markup element including the computed first characteristic is created in a markup language document. The resource is retrieved from the second computer according to a resource indicator that references the resource. A second characteristic of the content of the retrieved resource is generated by computing a hash of the content of the retrieved resource according to a particular hash algorithm. The second characteristic is ascertained to be identical to the first characteristic. The resource indicator and the first characteristic are included in the markup element. The created markup element includes a first attribute-value pair and a second attribute-value pair within distinct non-overlapping portions of the markup element.

20 Claims, 4 Drawing Sheets

(56) References Cited

U.S. PATENT DOCUMENTS

| | | |
|---|---|---|
| 7,096,493 B1 | 8/2006 | Liu |
| 7,290,131 B2 | 10/2007 | Beynon et al. |
| 7,318,238 B2 | 1/2008 | Elvanoglu et al. |
| 7,519,726 B2 | 4/2009 | Palliyil et al. |
| 7,523,452 B1 | 4/2009 | Kamity et al. |
| 7,536,725 B2 | 5/2009 | Raciborski |
| 7,543,018 B2 | 6/2009 | Appelman |
| 2002/0059364 A1 | 5/2002 | Coulthard et al. |
| 2002/0078087 A1 | 6/2002 | Stone |
| 2003/0018896 A1 | 1/2003 | Aoshima et al. |
| 2004/0105545 A1 | 6/2004 | Khandelwal et al. |
| 2005/0010788 A1 | 1/2005 | Craft |
| 2005/0234908 A1 | 10/2005 | Lowrance et al. |

OTHER PUBLICATIONS

Bruce, B., Sams Teach Yourself Macromedia Dreamweaver 3 in 24 Hours, copyright Apr. 14, 2000, Chapter 3, Set Lots o'Links: Hyperlinks, URLs, Anchors, and Mailto Links, pp. 36-46.

Response to 312 Amendment (Mail Date Aug. 27, 2013), for U.S. Appl. No. 11/586,883, filed Oct. 26, 2006, First Named Inventor Kyle N. Patrick.

Amendment 312 (filed Jul. 22, 2013), for U.S. Appl. No. 11/586,883, filed Oct. 26, 2006, First Named Inventor Kyle N. Patrick.

Notice of Allowance (Mail Date May 28, 2013), for U.S. Appl. No. 11/586,883, filed Oct. 26, 2006, First Named Inventor Kyle N. Patrick.

Final Office Action (Mail Date Feb. 13, 2013), for U.S. Appl. No. 11/586,883, filed Oct. 26, 2006, First Named Inventor Kyle N. Patrick.

Response (Filed Nov. 21, 2012), for U.S. Appl. No. 11/586,883, filed Oct. 26, 2006, First Named Inventor Kyle N. Patrick.

Office Action (Mail Date Aug. 23, 2012), for U.S. Appl. No. 11/586,883, filed Oct. 26, 2006, First Named Inventor Kyle N. Patrick.

RCE (Filed Dec. 29, 2011), for U.S. Appl. No. 11/586,883, filed Oct. 26, 2006, First Named Inventor Kyle N. Patrick.

Final Office Action (Mail Date Oct. 13, 2011), for U.S. Appl. No. 11/586,883, filed Oct. 26, 2006, First Named Inventor Kyle N. Patrick.

Response (Filed Jun. 28, 2011), for U.S. Appl. No. 11/586,883, filed Oct. 26, 2006, First Named Inventor Kyle N. Patrick.

Office Action (Mail Date Mar. 29, 2011), for U.S. Appl. No. 11/586,883, filed Oct. 26, 2006, First Named Inventor Kyle N. Patrick.

Response (Filed Jan. 3, 2011), for U.S. Appl. No. 11/586,883, filed Oct. 26, 2006, First Named Inventor Kyle N. Patrick.

Office Action (Mail Date Oct. 4, 2010), for U.S. Appl. No. 11/586,883, filed Oct. 26, 2006, First Named Inventor Kyle N. Patrick.

RCE (Filed Jul. 26, 2010), for U.S. Appl. No. 11/586,883, filed Oct. 26, 2006, First Named Inventor Kyle N. Patrick.

Final Office Action (Mail Date Apr. 27, 2010), for U.S. Appl. No. 11/586,883, filed Oct. 26, 2006, First Named Inventor Kyle N. Patrick.

Response (Filed Jan. 4, 2010), for U.S. Appl. No. 11/586,883, filed Oct. 26, 2006, First Named Inventor Kyle N. Patrick.

Office Action (Mail Date Oct. 7, 2009), for U.S. Appl. No. 11/586,883, filed Oct. 26, 2006, First Named Inventor Kyle N. Patrick.

VERIFYING CONTENT OF RESOURCES IN MARKUP LANGUAGE DOCUMENTS BY INCLUSION OF A HASH ATTRIBUTE-VALUE PAIR IN REFERENCES TO THE CONTENT

This application is a continuation application claiming priority to Ser. No. 11/586,883, filed Oct. 26, 2006, now U.S. Pat. No. 8,549,390, issued Oct. 1, 2013.

FIELD OF THE INVENTION

The invention relates to a method of verifying the resource content of a markup language document and a method for authoring a markup language document.

BACKGROUND OF THE INVENTION

A user agent that conforms to a markup language is able to process documents written in that markup language. For example, a web browser that conforms to Hyper Text Markup Language (HTML) is able to process HTML documents. The document may include a markup element that references a resource. A non-exhaustive list of examples for the resource includes a picture, an audio file, a video file, an executable file, and another document written in the markup language.

The user agent will retrieve the resource from its location as specified in the markup element via a communication system. The content of the resource retrieved by the user agent may differ from what the author of the document intended. For example, due to noise in the communication system or due to other technical problems, the resource retrieved by the user agent may have errors. In another example, the resource may have been replaced, either accidentally or maliciously, by another resource.

For example, a webpage authored by a person includes a picture of a flower that is stored on a remote server. When the author of the webpage included in it a reference to the picture on the remote server, the referenced picture was the picture of the flower. Sometime after the webpage was authored, the picture of the flower was replaced at the remote server with a picture of a donkey. As long as the picture of the donkey has the same filename as the picture of the flower, when a user accesses the webpage, the picture of the donkey will be displayed instead of the picture of the flower.

In another example, a main website has large files available for download, and a mirror website stores copies of these large files. When a user at the main website clicks on a hyperlink to download one of the large files, the user's browser is redirected to download the large file from the mirror website. If the large file at the mirror website has a virus how is the user to know that the large file downloaded from the mirror website is a true copy of the large file at the main website? Currently, the main website hosts a hash of the large file. The user can download the hash from the main website, compute a hash of the large file downloaded from the mirror website, and compare the two. But the onus is on the user to do this. If the computed hash matches the hash downloaded from the main website, the user knows that the large file downloaded from the mirror website is identical to that on the main website.

SUMMARY OF THE INVENTION

According to an embodiment of the invention there is provided a method for verifying resource content which includes extracting a characteristic of the content of a resource from a markup element of a markup language document, where the resource is referenced by the markup element with a resource indicator, retrieving a resource according to the resource indicator, and comparing a characteristic of the content of the retrieved resource to the extracted characteristic.

According to another embodiment of the invention there is provided a method for authoring a markup language document, the method comprising the step of including in a markup element of the markup language document a characteristic of the content of a resource that is referenced by the markup element with a resource indicator.

According to yet another embodiment of the invention there is provided a computer program product comprising a computer readable storage medium having computer readable program code stored therein for authoring a markup language document wherein the computer readable program code when executed on a computer causes the computer to include in a markup element of the markup language document a characteristic of the content of a resource that is referenced by the markup element with a resource indicator.

According to still yet another embodiment of the invention there is provided a computer program product comprising a computer readable storage medium having computer readable program code stored therein, wherein the computer readable program code when executed on a computer causes the computer to extract a characteristic of the content of a resource from a markup element of a markup language document, where the resource is referenced by the markup element with a resource indicator, retrieving a resource according to the resource indicator, and comparing a characteristic of the content of the retrieved resource to the extracted characteristic.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

An authoring tool that generates documents in a markup language creates markup elements in the documents. If a markup element references a resource, the tool is able to include a characteristic of the reference in the markup element. The characteristic can subsequently be used to verify that the content of the resource, when retrieved by a user agent, is identical to the content of the resource that the author had access to at the time the characteristic was generated. The authoring tool may generate the characteristic itself, or may obtain the characteristic from another utility that generates the characteristic.

Alternatively, an author may create a document in a markup language without the assistance of an authoring tool. The author is able to manually program a markup element of the document to include a characteristic of the reference that is referenced by the markup element.

If a markup element that references a resource includes such a characteristic of the resource, the user agent processing the markup element uses the characteristic to verify the content of the retrieved resource. If the verification fails, the user agent has determined that the content of the retrieved resource is not identical to the content of the resource which the author of the document used to create the characteristic that is included in the markup element.

The characteristic may be included in the markup element as an attribute or in any other suitable form.

In one embodiment, the markup element also includes an identification of the method used to generate the characteristic. For example, the characteristic is the hash of the content of the resource according to a particular hashing algorithm, and the particular hashing algorithm is identified in the markup element.

In another embodiment, the method used to generate the characteristic is identified elsewhere in the markup language document.

In yet another embodiment, the method used to generate the characteristic is predefined and is not identified at all in the markup language document.

Embodiments of the invention relate to computer markup languages in general and to verification of content of resources referenced by markup elements of markup language documents in particular.

A non-exhaustive list of examples for markup languages includes a) HTML (Hyper Text Markup Language) 4.01 published Dec. 24, 1999 as a W3C (World Wide Web Consortium) recommendation;

b) ISO/IEC 15445:2000 ("ISO HTML") published May 15, 2000;

c) XHTML (Extensible HTML) 1.0 published Jan. 26, 2000 as a W3C recommendation, later revised and republished Aug. 1, 2002;

d) SGML (Standard Generalized Markup Language) that is an ISO standard 8879:1986 "information processing—Text and office systems—Standard Generalized Markup Language";

e) XML (Extensible Markup Language) 1.0 defined by W3C in 1998 and republished Feb. 4, 2004;

f) XML 1.1 published Feb. 4, 2004 by the W3C;

g) RDF (Resource Description Framework) published in 1999 by the W3C and again in 2004;

h) RSS (Rich Site Summary) versions 0.90, 0.91, 0.92, 0.93, 0.94. 1.0, 1.1 and 2.01, published by the RSS-DEV working group and/or by other organizations;

i) Atom 1.0 published July 2005 and adopted by IETF (Internet Engineering Task Force) Atompub Working Group as a "Proposed Standard";

j) WML (Wireless Markup Language) 1.1 published by the W3C; and k) any other suitable markup languages.

Figure 1:
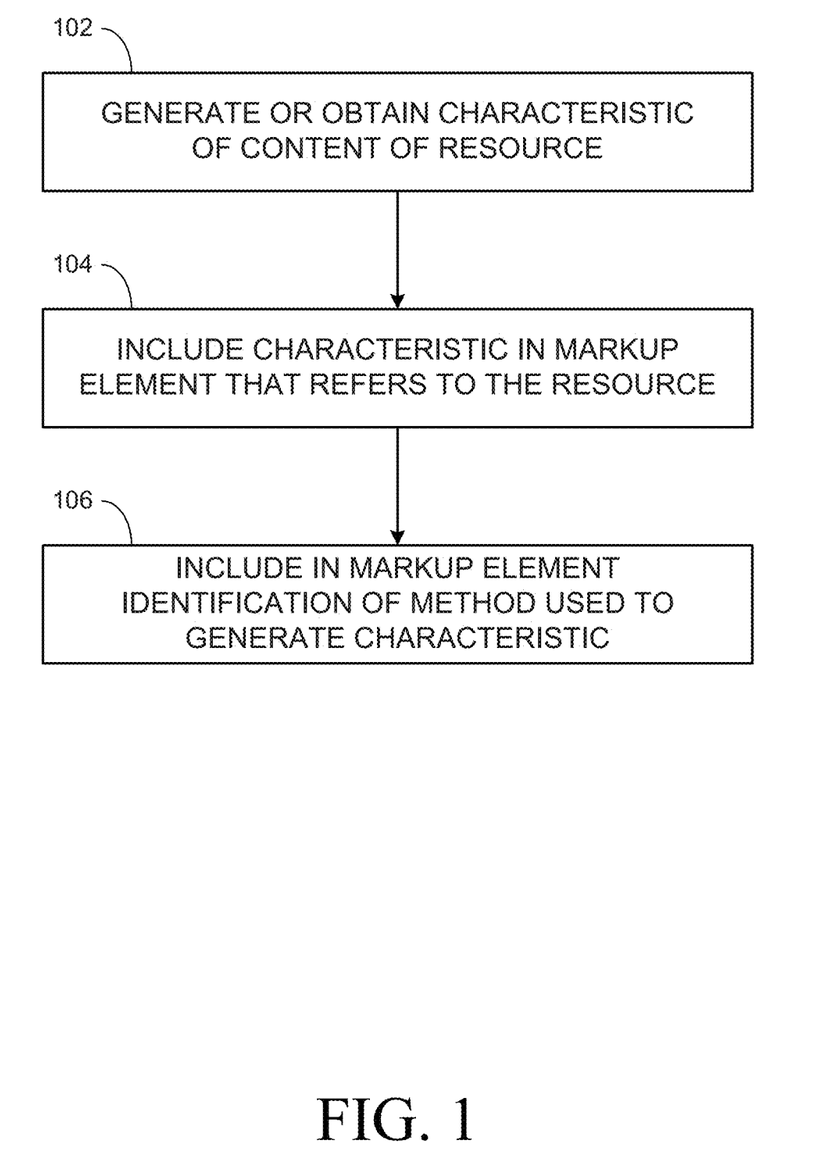
FIG. 1 is a flowchart of an exemplary method for authoring a markup language document.

Reference is made to FIG. 1, which is a flowchart of an exemplary method for authoring a markup language document. The method may be implemented by a markup language authoring tool.

A user of the tool may indicate that a particular resource is to be included in the markup language document. The tool may therefore create a markup element in the markup language document, where the markup element references the resource with a resource indicator.

In one example, the user indicates that a webpage is to include the picture lily.gif. The tool will therefore create a markup element in the HTML document representing the webpage as follows:

<img src="http://plants.com/flowers/lily.gif"> where the resource indicator http://plants.com/flowers/lily.gif indicates the location and access method for retrieving the picture.

In another example, the user indicates that a webpage is to include a hyperlink labeled "download" to a file myprogram.exe. The tool will therefore create a markup element in the HTML document representing the webpage as follows:

<a href="http://filemirror.com/myprogram.exe"> download </a> where the resource indicator http://filemirror.com/myprogram.exe indicates the location and access method for downloading the file.

At step 102, the tool generates or otherwise obtains a characteristic of the content of the resource referenced by the markup element.

For example, the characteristic may be a hash of the content of the resource according to a particular hash algorithm.

At step 104, the tool includes the characteristic in the markup element that references the resource. The characteristic may be included in the markup element as an attribute or in any other suitable form. The attribute defined for the characteristic, if any, is an optional attribute and a user agent conforming to the markup language will still be able to process markup elements that omit this optional attribute.

The markup element in the flower picture example is therefore as follows:

```
<img src="http://plants.com/flowers/lily.gif"
    hash= "md5:bbd5411b3558326cbce0306fcae32efe">
``` where hash is the name of the attribute, md5 identifies the hash algorithm used to generate the characteristic, and the 128-bit value following the colon is the characteristic generated by applying md5 to the picture lily.gif.

The markup element in the mirror website example is therefore as follows:

```
<a href="http://filemirror.com/myprogram.exe"
    hash= "md5:ccd5411b3558326cbce0306fcae32e26"> download </a>
``` where the 128-bit value following the colon is the characteristic generated by applying md5 to the file myprogram.exe.

At step 106, the tool includes in the markup element an identification of the method used to generate the characteristic. For example, the characteristic is the hash of the content of the resource according to a particular hashing algorithm, and the particular hashing algorithm is identified in the markup element. Alternatively, the method used to generate the characteristic is identified elsewhere in the markup language document, or the method used to generate the characteristic is predefined and is not identified at all in the markup language document.

Figure 2:
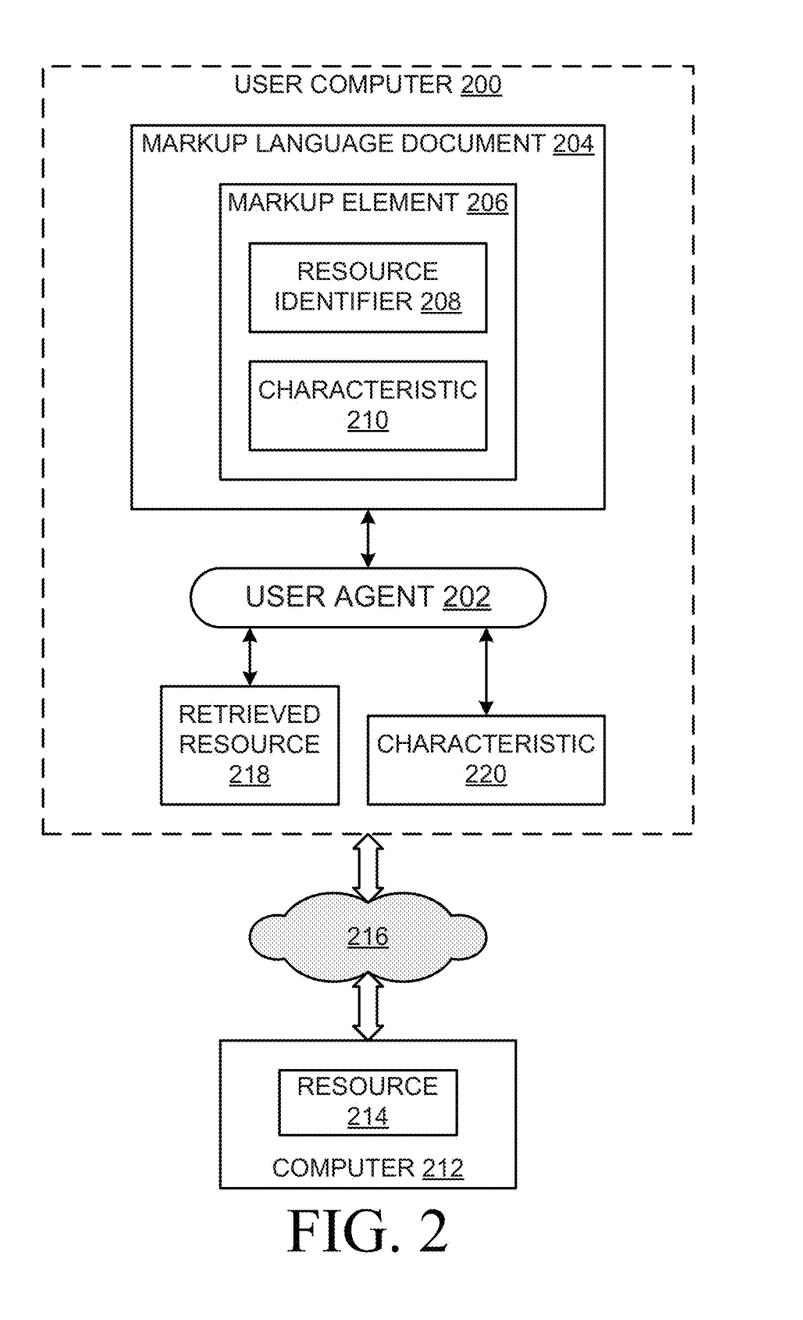
FIG. 2 is a block diagram of an exemplary system of computers.

Reference is made to FIG. 2, which is a block diagram of an exemplary system of computers. A user computer 200 has installed thereon a user agent 202 conforming to one or more markup languages. A non-exhaustive list of examples of user agents includes web browsers, content aggregators, proxy servers and search engines.

User computer 200 stores a markup language document 204 that includes a markup element 206. Markup element 206 references a resource with a resource indicator 208. Markup element 206 also includes a characteristic 210 of the resource. Markup language document 204 may have been generated by an authoring tool or by a human.

Another computer 212 stores a resource 214. Resource identifier 208 identifies resource 214 on computer 212. Computer 212 and user computer 200 are coupled via a communication infrastructure 216. Communication infrastructure 216 may include any combination of private and public networks, and may optionally include parts of the Internet.

Figure 3:
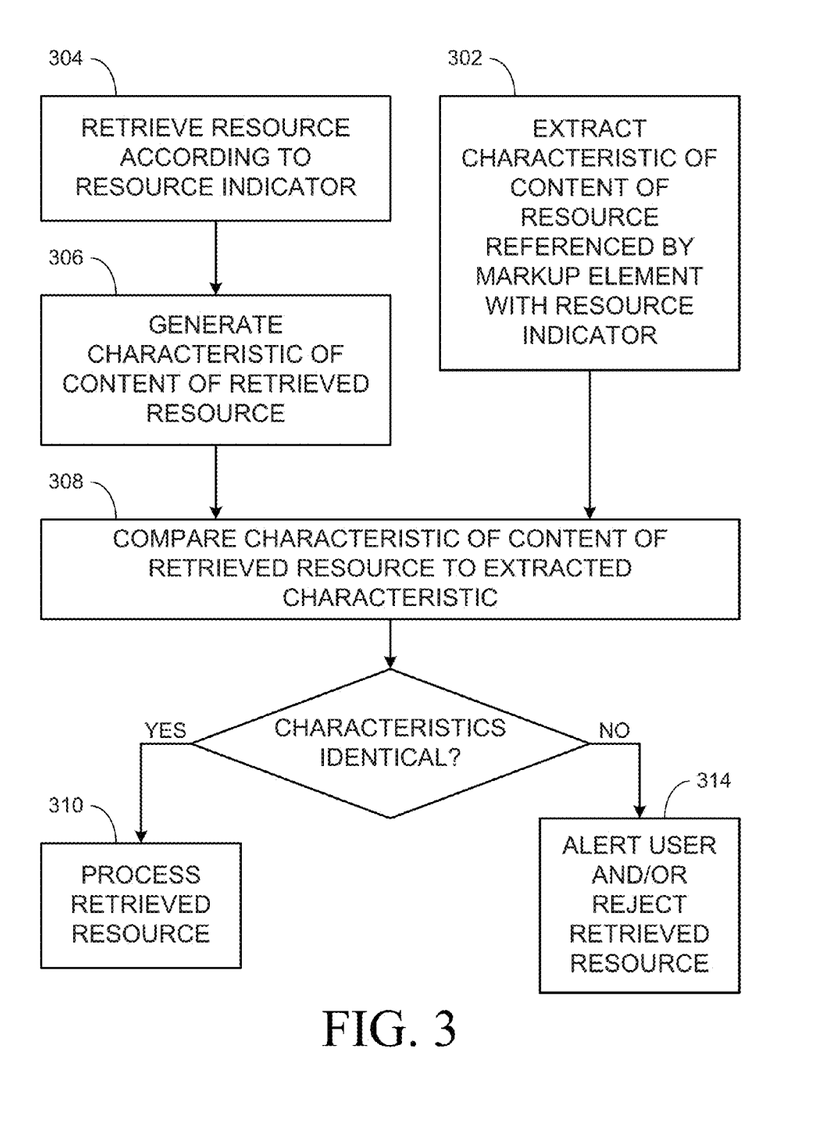
FIG. 3 is a flowchart of an exemplary method for verifying the content of a resource referenced by a markup element in a markup language document.

Reference is made additionally to FIG. 3, which is a flowchart of an exemplary method for verifying the content of a resource referenced by a markup element in a markup language document. The method may be implemented by a user agent conforming to the markup language such as user agent 202.

At step 302, user agent 202 extracts characteristic 210 from markup element 206.

At step 304, user agent 202 retrieves resource 214 according to resource identifier 208—that is, from computer 212—thus storing a retrieved resource 218 at user computer 200. At step 306, user agent 202 generates or otherwise obtains a characteristic 220 of the content of retrieved resource 218. For example, user agent 202 may compute a hash of the content of the retrieved resource according to a particular algorithm. Alternatively, the user agent may obtain the hash from another utility.

The extraction of characteristic 210 from markup element 206 may occur before, during or after the retrieval of retrieved resource 218.

At step 308, user agent 202 compares characteristic 220 of the content of retrieved resource 218 to extracted characteristic 210.

If the characteristics are identical, then user agent 202 processes retrieved resource 218 at step 310. In the flower picture example, the web browser displays the retrieved picture in the webpage. In the mirror website example, the web browser completes the download of the file myprogram.exe.

If the characteristics are not identical, then at step 314 user agent 202 alerts its user and/or rejects retrieved resource 218. If the characteristics are not identical, then retrieved resource 218 is not identical to the resource from which characteristic 210 in markup element 206 was generated. This discrepancy may be caused by transmission errors due to noise in communications system 216 or other technical problems. Alternatively, this discrepancy may be caused because resource 214 identified by resource identifier 208 is not a true copy of the resource from which characteristic 210 in markup element 206 was generated. The resource from which characteristic 210 in markup element 206 was generated may have been replaced, accidentally or maliciously, with another resource.

Embodiments of the invention can take the form of an entirely hardware embodiment, an entirely software embodiment, or an embodiment containing both hardware and software elements. The exemplary embodiment of the invention discussed above is implemented in software, which includes but is not limited to firmware, resident software, microcode, and the like.

Furthermore, embodiments of the invention can take the form of a computer program product accessible from a computer-readable medium providing program code for use by or in connection with a computer or any instruction execution system. For the purpose of this description, a computer-readable medium can be any apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), FLASH memory, a rigid magnetic disk and an optical disk. Current examples of optical disks include compact disk-read only memory (CD ROM), compact disk-read/write (CD-R/W) and digital versatile disk (DVD).

Figure 4:
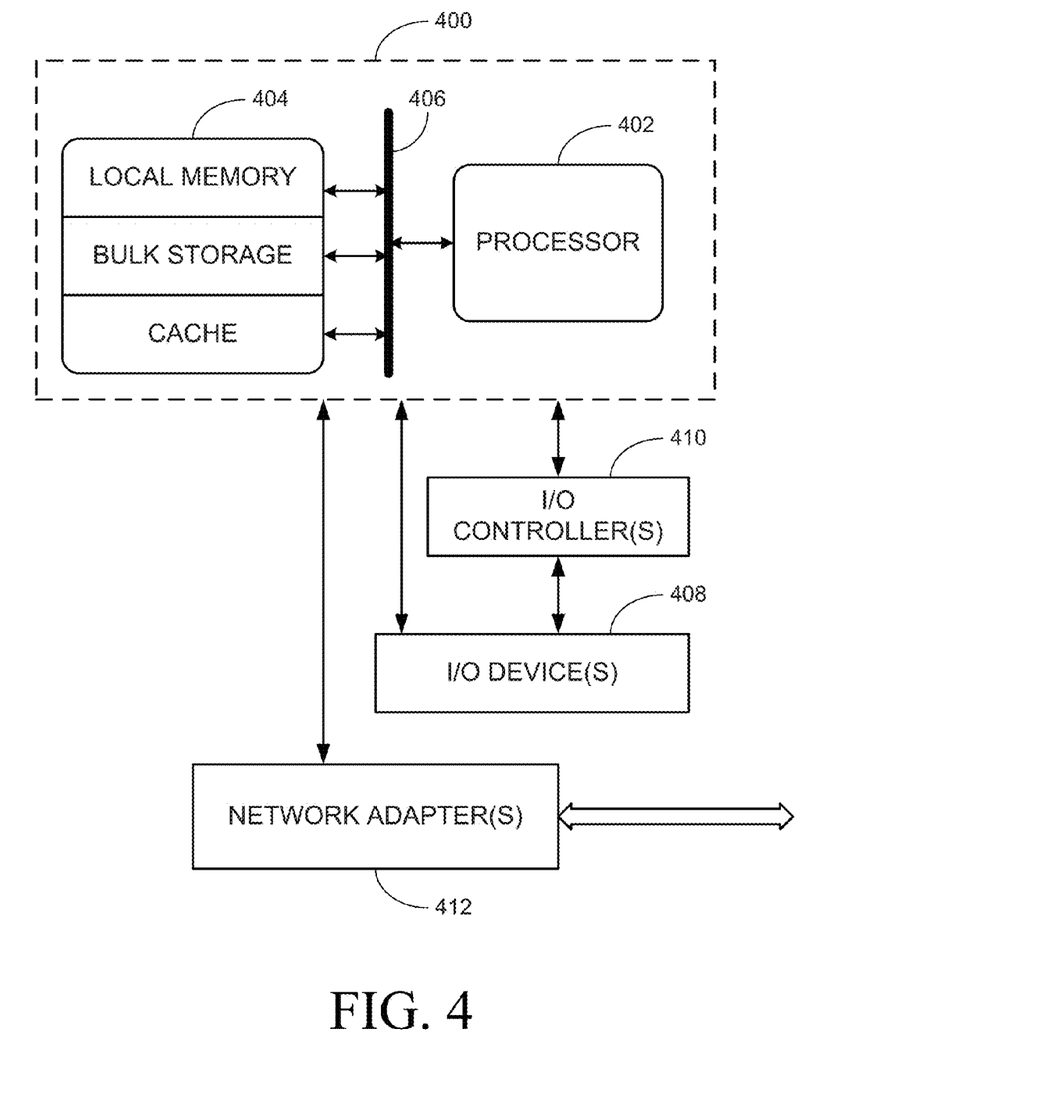
FIG. 4 is a block diagram of an exemplary computing apparatus.

FIG. 4 is a block diagram of an exemplary computing apparatus. A data processing system 400 suitable for storing and/or executing program code will include at least one processor 402 coupled directly or indirectly to memory elements 404 through a system bus 406. The memory elements 404 can include local memory employed during actual execution of the program code, bulk storage, and cache memories which provide temporary storage of at least some program code in order to reduce the number of times code must be retrieved from bulk storage during execution.

Input/output (I/O) devices 408—including but not limited to keyboards, displays, pointing devices, and the like—can be coupled to data processing system 400 either directly or through intervening I/O controllers 410.

Network adapters 412 may also be coupled to data processing system 400 to enable data processing system 400 to become coupled to other data processing systems or remote printers or storage devices through intervening private or public networks. Modems, cable modem and Ethernet cards are just a few of the currently available types of network adapters.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the appended claims.

What is claimed is:

1. A method for verifying resource content, said method comprising:

a processor at a first computer computing a first characteristic of the content of a resource stored at a second computer coupled to the first computer via a communication infrastructure;

said processor at the first computer creating, in a markup language document, a markup element comprising the computed first characteristic;

said processor at the first computer extracting the first characteristic from the markup element in the markup language document;

said processor at the first computer retrieving the resource from the second computer according to a resource indicator that references the resource;
said processor at the first computer generating a second characteristic of the content of the retrieved resource, wherein said generating the second characteristic comprises computing a hash of the content of the retrieved resource according to a particular hash algorithm; and
said processor at the first computer ascertaining that the second characteristic is identical to the first characteristic,
wherein said creating the markup element comprises:
including the resource indicator in the markup element;
computing the first characteristic by computing, according to the particular hash algorithm, a hash of the content of the resource referenced by the resource indicator; and
including the first characteristic in the markup element,
wherein said creating the markup element results in the markup element comprising a first attribute-value pair and a second attribute-value pair,
wherein the first attribute-value pair and the second attribute-value pair are within distinct non-overlapping portions of the markup element,
wherein the first attribute-value pair comprises both a first attribute denoting the resource indicator and a value pertaining to the first attribute, said value pertaining to the first attribute consisting of a first character string that consists of the resource indicator,
wherein the second attribute-value pair comprises both a second attribute denoting the first characteristic and a value pertaining to the second attribute, said value pertaining to the second attribute consisting of a second character string that comprises an identifier of the particular hash algorithm and the generated first characteristic, and
wherein the first attribute and the second attribute are different attributes.

2. The method of claim 1,
wherein said creating the markup element results in the markup element consisting of the first attribute-value pair and the second attribute-value pair,
wherein the first attribute-value pair consists of both the first attribute and the value of the first attribute,
wherein the second attribute-value pair consists of both the second attribute and the value of the second attribute.

3. The method of claim 2, wherein a first and second quote character in the markup element determines where the first attribute-value pair respectively begins and ends, and wherein a third and fourth quote character in the markup element determines where the second attribute-value pair respectively begins and ends.

4. The method of claim 1, said method further comprising:
responsive to said ascertaining that the second characteristic is identical to the first characteristic, said processor at the first computer processing the retrieved resource.

5. The method of claim 4, wherein said processing the retrieved resource comprises displaying the retrieved resource.

6. The method of claim 1, wherein said extracting the first characteristic is performed during performance of said retrieving the resource from the second computer.

7. The method of claim 1, wherein said extracting the first characteristic is performed after said retrieving the resource from the second computer.

8. A computer program product comprising a computer readable hardware storage device having computer readable program code stored therein, wherein the computer readable program code upon being executed by a processor of a first computer implements a method for verifying resource content, said method comprising:
said processor computing a first characteristic of the content of a resource stored at a second computer coupled to the first computer via a communication infrastructure;
said processor creating, in a markup language document, a markup element comprising the computed first characteristic;
said processor extracting the first characteristic from the markup element in the markup language document;
said processor retrieving the resource from the second computer according to a resource indicator that references the resource;
said processor generating a second characteristic of the content of the retrieved resource, wherein said generating the second characteristic comprises computing a hash of the content of the retrieved resource according to a particular hash algorithm; and
said processor ascertaining that the second characteristic is identical to the first characteristic,
wherein said creating the markup element comprises:
including the resource indicator in the markup element;
computing the first characteristic by computing, according to the particular hash algorithm, a hash of the content of the resource referenced by the resource indicator; and
including the first characteristic in the markup element,
wherein said creating the markup element results in the markup element comprising a first attribute-value pair and a second attribute-value pair,
wherein the first attribute-value pair and the second attribute-value pair are within distinct non-overlapping portions of the markup element,
wherein the first attribute-value pair comprises both a first attribute denoting the resource indicator and a value pertaining to the first attribute, said value pertaining to the first attribute consisting of a first character string that consists of the resource indicator,
wherein the second attribute-value pair comprises both a second attribute denoting the first characteristic and a value pertaining to the second attribute, said value pertaining to the second attribute consisting of a second character string that comprises an identifier of the particular hash algorithm and the generated first characteristic, and
wherein the first attribute and the second attribute are different attributes.

9. The computer program product of claim 8,
wherein said creating the markup element results in the markup element consisting of the first attribute-value pair and the second attribute-value pair,
wherein the first attribute-value pair consists of both the first attribute and the value of the first attribute,
wherein the second attribute-value pair consists of both the second attribute and the value of the second attribute.

10. The computer program product of claim 9, wherein a first and second quote character in the markup element determines where the first attribute-value pair respectively begins and ends, and wherein a third and fourth quote character in the markup element determines where the second attribute-value pair respectively begins and ends.

11. The computer program product of claim 8, said method further comprising:
responsive to said ascertaining that the second characteristic is identical to the first characteristic, said processor at the first computer processing the retrieved resource.

12. The computer program product of claim 11, wherein said processing the retrieved resource comprises displaying the retrieved resource.

13. The computer program product of claim 8, wherein said extracting the first characteristic is performed during performance of said retrieving the resource from the second computer.

14. The computer program product of claim 8, wherein said extracting the first characteristic is performed after said retrieving the resource from the second computer.

15. A system comprising a first computer, said first computer comprising a processor and a computer readable memory unit coupled to the processor, said memory unit containing program code which upon being executed by the processor implements a method for verifying resource content, said method comprising:
said processor computing a first characteristic of the content of a resource stored at a second computer coupled to the first computer via a communication infrastructure;
said processor creating, in a markup language document, a markup element comprising the computed first characteristic;
said processor extracting the first characteristic from the markup element in the markup language document;
said processor retrieving the resource from the second computer according to a resource indicator that references the resource;
said processor generating a second characteristic of the content of the retrieved resource, wherein said generating the second characteristic comprises computing a hash of the content of the retrieved resource according to a particular hash algorithm; and
said processor ascertaining that the second characteristic is identical to the first characteristic,
wherein said creating the markup element comprises:
including the resource indicator in the markup element;
computing the first characteristic by computing, according to the particular hash algorithm, a hash of the content of the resource referenced by the resource indicator; and
including the first characteristic in the markup element,
wherein said creating the markup element results in the markup element comprising a first attribute-value pair and a second attribute-value pair,
wherein the first attribute-value pair and the second attribute-value pair are within distinct non-overlapping portions of the markup element,
wherein the first attribute-value pair comprises both a first attribute denoting the resource indicator and a value pertaining to the first attribute, said value pertaining to the first attribute consisting of a first character string that consists of the resource indicator,
wherein the second attribute-value pair comprises both a second attribute denoting the first characteristic and a value pertaining to the second attribute, said value pertaining to the second attribute consisting of a second character string that comprises an identifier of the particular hash algorithm and the generated first characteristic, and
wherein the first attribute and the second attribute are different attributes.

16. The system of claim 15,
wherein said creating the markup element results in the markup element consisting of the first attribute-value pair and the second attribute-value pair,
wherein the first attribute-value pair consists of both the first attribute and the value of the first attribute,
wherein the second attribute-value pair consists of both the second attribute and the value of the second attribute.

17. The system of claim 16, wherein a first and second quote character in the markup element determines where the first attribute-value pair respectively begins and ends, and wherein a third and fourth quote character in the markup element determines where the second attribute-value pair respectively begins and ends.

18. The system of claim 15, said method further comprising:
responsive to said ascertaining that the second characteristic is identical to the first characteristic, said processor at the first computer processing the retrieved resource.

19. The system of claim 18, wherein said processing the retrieved resource comprises displaying the retrieved resource.

20. The system of claim 15, wherein said extracting the first characteristic is performed during performance of said retrieving the resource from the second computer.

* * * * *